United States Patent
Kuroki et al.

(10) Patent No.: US 7,965,405 B2
(45) Date of Patent: Jun. 21, 2011

(54) IMAGE FORMING APPARATUS USING CHANGEABLE THRESHOLD VALUE FOR MEMORY ALLOCATION

(75) Inventors: Jun Kuroki, Tokyo (JP); Yoshinori Tanaka, Tokyo (JP); Masahiro Ozawa, Tokyo (JP); Hiroshi Nogawa, Tokyo (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1170 days.

(21) Appl. No.: 11/703,217

(22) Filed: Feb. 7, 2007

(65) Prior Publication Data

US 2008/0018934 A1    Jan. 24, 2008

(30) Foreign Application Priority Data

Jul. 20, 2006  (JP) ................................ 2006-198234

(51) Int. Cl.
*G06F 15/00* (2006.01)
*G06F 3/12* (2006.01)
*G06K 1/00* (2006.01)
(52) U.S. Cl. ..................................... 358/1.15; 358/1.13
(58) Field of Classification Search ................ 358/1.15, 358/1.1, 1.18, 1.13
See application file for complete search history.

(56) References Cited

U.S. PATENT DOCUMENTS

| 2003/0236797 | A1* | 12/2003 | Nita .............................. 707/200 |
| 2004/0136032 | A1* | 7/2004 | Kizaki et al. ................. 358/1.16 |
| 2005/0162694 | A1 | 7/2005 | Chiba et al. |

FOREIGN PATENT DOCUMENTS

| JP | 10-129050 A | 5/1998 |
| JP | 2005-271276 | 10/2005 |
| JP | 2005/349772 | 12/2005 |
| WO | WO 2004/091922 | 10/2004 |

* cited by examiner

*Primary Examiner* — Douglas Q Tran
(74) *Attorney, Agent, or Firm* — Buchanan Ingersoll & Rooney PC

(57) ABSTRACT

An image forming apparatus includes a storing section that has a common storage area, the common storage area having a plurality of areas that are coexisting in the common storage area in accordance with a threshold value and are used to generate and store a plurality of pieces of data that have different formats based on electronic data; a language format discriminating section to discriminate a description language format of the electronic data; and a control section to change the threshold value based on the description language format discriminated by the language format discriminating section.

18 Claims, 4 Drawing Sheets

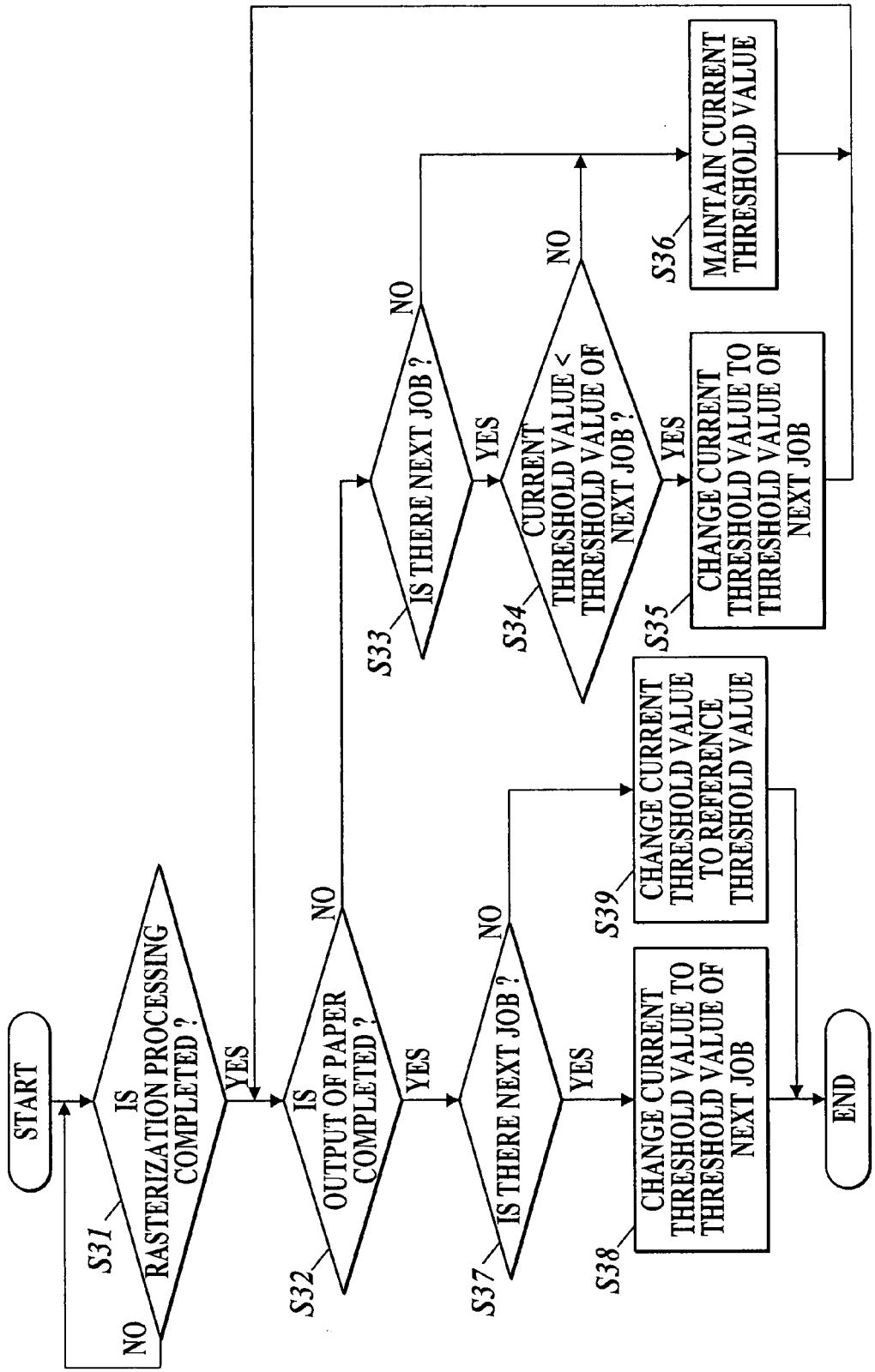

IMAGE FORMING APPARATUS USING CHANGEABLE THRESHOLD VALUE FOR MEMORY ALLOCATION

BACKGROUND OF THE INVENTION

1. Field of the Invention

The present invention relates to an image forming apparatus, an image forming method and a computer-readable recording medium in which a program is stored, which generates and stores a plurality of pieces of data in different formats in a common storage area in accordance with a threshold value.

2. Description of Related Art

In recent years, an image forming apparatus such as network-type copier, printer, MFP (Multi Function Peripheral) and the like became widespread. The image forming apparatus receives data in PDL (Page Description Language) format such as PS (Post Script (registered trademark)) and PCL (Printer Control Language) prepared by an external apparatus such as a PC (Personal Computer), through a network such as a LAN, once converts the received piece of data into data (intermediate data) in intermediate format and stores the intermediate data in a memory, successively reads out the intermediate data stored in the memory, converts the same into bitmap data and conduct printing.

To efficiently use a memory, Japanese Patent Application Publication Laid-open No. H10-129050 discloses, as such an image forming apparatus, a print processing apparatus which includes a plurality of input buffers each of which stores print data in band unit, a print data development processing section which develops (rasterizes) the print data into rasterized print data, a plurality of band buffers each of which stores the rasterized print data in band unit, and a work area in which one of or both of data and code required for development processing of the print data. The print processing apparatus calculates and rewrites boundary information of each area in the plurality of input buffers in accordance with amount of print data per band unit or amount of print data per page unit, calculates and rewrites boundary information of each area in the plurality of band buffers based on the image output speed determined in accordance with generating time of the print data and developing time of the print data, and rewrites the boundary information between each of the areas of the work area.

There is a technique in which there is provided a common storage area having an area (hereinafter referred to as intermediate area) which is used to generate and store intermediate data, and an area (hereinafter referred to as work area) which is used to generate bitmap data and to store the intermediate data. In this technique, data can be stored without limitation with respect to the work area in the common area, and the intermediate area is limited by providing a preset threshold value. In many cases, this preset threshold value is preset based on the memory capacity required to convert and generate intermediate data generated from PDL data with resolution and sheet size (e.g., A4 sheet) having high image forming frequency, into bitmap data, and to store the bitmap data.

There is developed an image forming apparatus which converts data in PDF (Portable Document Format) and XPS (XML Paper Specification), which are description language format of electronic document having a transparency function to allow a plurality of pieces of image data to translucently superpose to display one image, into intermediate data, and stores the intermediate data in a memory. The image forming apparatus successively reads out the intermediate data stored in the memory, converts the intermediate data into a bitmap data and conducts printing.

However, data in description language format such as the PDF and XPS having the transparency function requires a voluminous work area compared with data in description language format such as PDL having no transparency function. Even in a case where the data is a data in description language having no transparency function, a work area required when the sheet size is large or resolution is high is much larger than an area of a preset threshold value.

When the work area is larger than the preset threshold value, there is an adverse possibility that the processing is stopped until the work area is secured and there is a problem that the throughput is reduced. It may also cause a problem that the work area can not be secured, such as a case where the intermediate data is stored in the common storage area up to its capacity limitation, and there is a problem that rasterization processing to generate and store the bitmap data is stopped.

When print-data is replaced with intermediate data and rasterized data is replaced with bitmap data as in Japanese Patent Application Publication Laid-open No. H10-129050, a capacity of an area where the intermediate data is stored is changed in accordance with the data amount of the intermediate data, and a capacity of an area where the bitmap data is stored is changed based on the image output speed corresponding to the generating time of the intermediate data and to the developing time of the intermediate data. Since these areas are changed based on the intermediate data, in a case where a large volume of area to store the bitmap data is required, a similar problem occurs.

SUMMARY

The present invention has been made in view of these circumstances, and it is an object of the invention to prevent the rasterization processing from being stopped and to suppress the reduction of the throughput.

To achieve at least one of the abovementioned objects, an image forming device reflecting one aspect of the present invention comprises: a storing section that has a common storage area, the common storage area having a plurality of areas that are coexisting in the common storage area in accordance with a threshold value and are used to generate and store a plurality of pieces of data different in format based on electronic data that is in a description language; a language format discriminating section to discriminate a description language format of the electronic data; and a control section to change the threshold value based on the description language format discriminated by the language format discriminating section.

Preferably, with respect to the abovementioned image forming apparatus, the control section changes the at least one threshold value in a case where it is determined by the language format discriminating section that the description language format is a format that supports a transparency function.

Preferably, with respect to the abovementioned image forming apparatus, the control section obtains a sheet size of each page from the electronic data in the description language format and changes the threshold value in accordance with the maximum sheet size of the obtained sheet sizes in a case where it is determined that the description language format includes information that indicate sheet size of each page, based on the description language format discriminated by the language format discriminating section.

Preferably, with respect to the abovementioned image forming apparatus, the control section changes the threshold value in a case where there is an external storing section which is used to generate data other than data that makes an image be formed on a recording medium among the plurality of pieces of data in different formats, the external storage area having an area to store the generated data.

Preferably, the abovementioned image forming apparatus further comprises: an image forming section which forms an image on a recording medium based on data, that makes the image be formed on the recording medium, among the plurality of pieces of data in different formats, wherein the control section changes the threshold value in accordance with a comparison result between a currently set threshold value and a threshold value corresponding to another piece of electronic data that makes another image be formed on the recording medium after the electronic data corresponding to the currently set threshold value, in a case where the image is not formed on the recording medium by the image forming section in accordance with the data that makes the image be formed on the recording medium, among the plurality of pieces of data in different formats which are generated and stored based on the electronic data corresponding to the currently set threshold value, the case where the another piece of electronic data that makes the another image be formed on the recording medium existing after the electronic data corresponding to the currently set threshold value.

Preferably, with respect to the abovementioned image forming apparatus, the plurality of pieces of data in different formats are data in bitmap format and data in intermediate format, the intermediate format having a format between the electronic data and the data in the bitmap format obtained by interpreting the electronic data, and the threshold value is a value which is used to generate the data in the intermediate format and limits an area in the common storage area where the data in the intermediate format is stored.

BRIEF DESCRIPTION OF THE DRAWINGS

The present invention will become more fully understood from the detailed description given hereinafter and the accompanying drawings which are given by way of illustration only, and thus are not intended as a definition of the limits of the scope of the invention, and wherein:

FIG. 4 is a flowchart of operation to change and set the threshold value calculated in step S23.

DETAILED DESCRIPTION OF THE PREFERRED EMBODIMENTS

An embodiment of the present invention will be described hereinafter with reference to the drawings.

First of all, a structure thereof will be explained.

Figure 1:
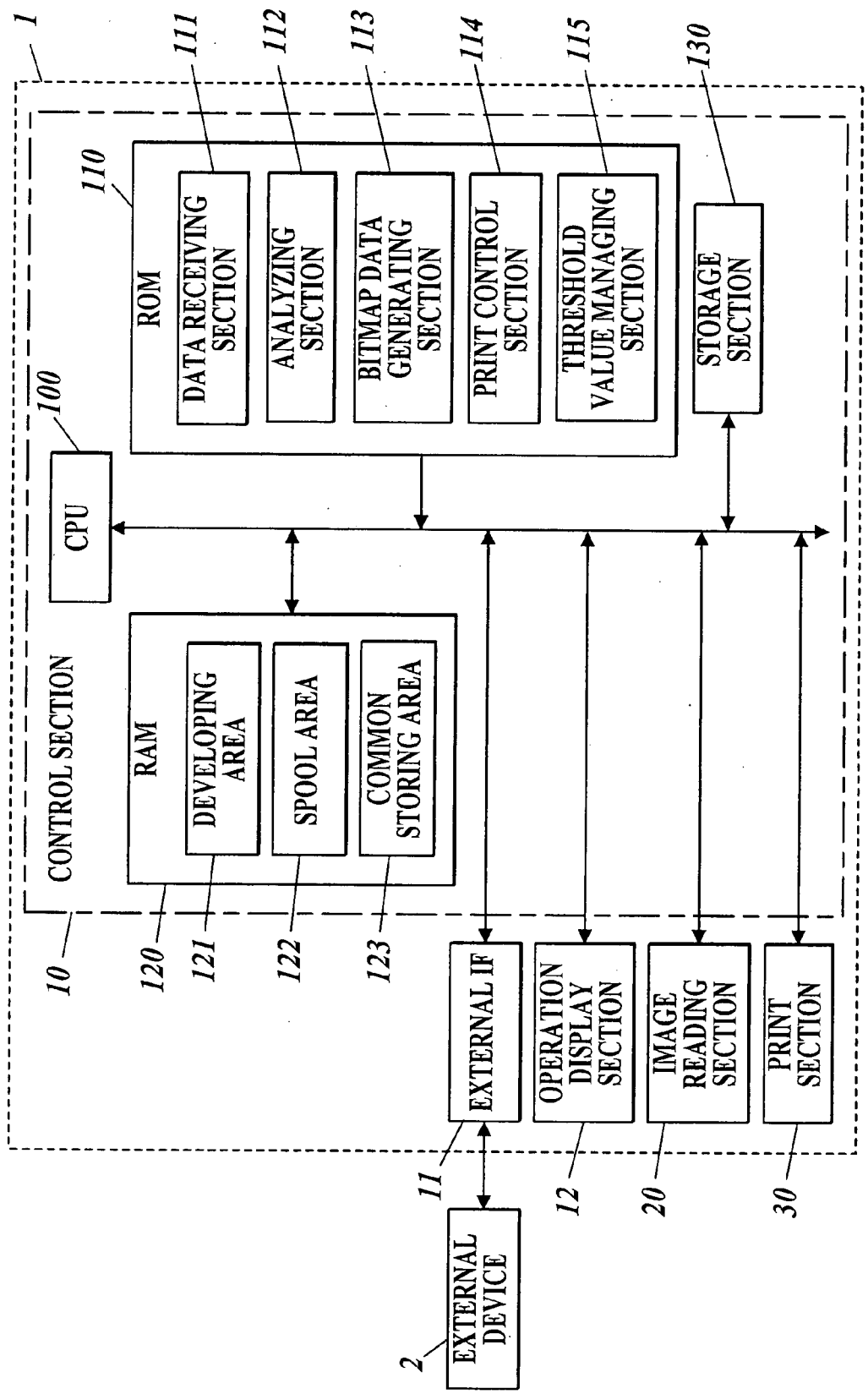
FIG. 1 is a control block diagram of an image forming apparatus 1 according to an embodiment.

FIG. 1 is a control block diagram of an image forming apparatus 1 of the embodiment.

As shown in FIG. 1, the image forming apparatus 1 includes a c10, an external IF (interface) 11, an operation display section 12, an image reading section 20 and a print section 30. These elements are connected to one another through buses or the like, and they can communicate with an external device 2 through the external IF 11.

The image forming apparatus 1 is a digital multifunction machine having a copying function to read out an image from a document to be read out (document, hereinafter) and to form the read out image on a recording medium (sheet, hereinafter) such as sheets of paper as sheet of paper to be processed, and a printer function to receive job data from the external device 2 such as a personal computer and to form and output the image on a sheet based on the received job data.

The job data includes image data in a predetermined description language format, and various setting information sets required when a sheet formed with an image is output based on the image data.

The control section 10 includes a CPU (Central Processing Unit) 100, a ROM (Read Only Memory) 110 a RAM (Random Access Memory) 120, and a storing section 130. The control section 10 develops, in the RAM 120 or a storing section 130, various processing programs and data stored in the ROM 110, and controls operations of various elements of the image forming apparatus 1 based on the program in a centralized manner. For example, the control section 10 switches between a copy mode, a print mode and a scanner mode in accordance with a command signal which is input from the operation display section 12 or the external device 2, and reads out a processing program corresponding to each mode, and controls a copying operation, a printing operation, and a reading operation of image data.

The CPU 100 generates and stores a plurality of pieces of data in different formats based on image data (PDL data, hereinafter) of page description language format such as post script (registered trademark) and PCL, or image data (image data such as PDF and XPL are collectively called electronic data) of description language format such as PDF (Portable Document Format) and XPL (XML Paper Specification) in cooperation with the ROM 110, the RAM 120 or the storing section 130. More specifically, as the plurality of pieces of data in different formats, electronic data is first interpreted to generate data in intermediate format (intermediate data, hereinafter) between the electronic data and data in bitmap format (bitmap data, hereinafter), stores the same in a later-described common storage area 123 in the RAM 120, and generates bitmap data based on the intermediate data and stores the same in the common storage area 123 in the RAM 120.

When intermediate data and bitmap data having different formats are stored in the common storage area 123, the CPU 100 stores and manages the intermediate data and the bitmap data using a threshold value.

The intermediate data is data except bitmap data which is for forming an image on a recording medium, among a plurality of pieces of data in different formats stored in the common storage area 123, and is data generated in accordance with characteristics of an object (text data, graphic data, image data and the like) included in the electronic data. An example of intermediate data of the text data and the graphic data is vector format data, and an example of intermediate data of the image data is data in a image format.

The CPU 100 realizes a function as a language format discriminating section for discriminating a description language format of electronic data included in job data which is input through the external IF 11 in cooperation with the ROM 110, the RAM 120 or the storing section 130, and a function as a control section for changing the threshold value of the later-described common storage area 123 based on the discriminated description language format.

When it is determined that the description language format has a transparency function based on the discriminated description language format, the CPU 100 adds a capacity which is preset in accordance with a kind of the description language format to a preset threshold value (reference threshold value, hereinafter), and changes the threshold value.

The transparency function is a function to allow a plurality of pieces of image data to translucently superpose and to display the plurality of pieces of image data as one image, and electronic data whose description language format is PDF, XPS or the like has this function.

The reference threshold value is preset based on a capacity of an area required to convert intermediate data generated from electronic data with resolution and sheet size (e.g., A4) having high image forming frequency, into bitmap data, and to store the bitmap data. The reference threshold value is a value inherent in the image forming apparatus 1 determined by the structure of the image forming apparatus 1.

In the case where a description language format has the transparency function, a capacity which is preset in accordance with a kind of the description language format and is added to the reference threshold value is a capacity based on statistics of a capacity of an area which is used to convert intermediate data, which is generated from data of preset resolution or data for one page of the sheet size with respect to electronic data in description language format having the transparency function, into bitmap data and to store the same, and based on a coefficient corresponding to a ratio of resolution which is set to calculate the statistics and various resolution. This capacity is calculated for each of kinds of the description language formats and for each of resolutions. For example, when the description language format of electronic data is PDF and resolution is 1200 [dpi], 10 [MB] is set as a capacity which is added to the reference threshold value.

When the description language format includes information indicative of sheet size of each page based on the discriminated description language format, the CPU 100 obtains the sheet size of each page from the electronic data in the description language format, adds a capacity which is previously set in accordance with the maximum sheet size among the obtained sheet sizes, and changes the threshold value.

A capacity which is preset in accordance with the sheet size to be added to the reference threshold value is a capacity which is previously calculated for each sheet size based on the preset sheet size (e.g., sheet size having high image forming frequency used when the reference threshold value is set) and a coefficient corresponding to a ratio of area between this preset sheet size and various sheet sizes. For example, in a case where the sheet size is A3, a capacity to be added to the reference threshold value is 15 [MB].

When there is an external storing section (storing section 130, in this embodiment) such as a HDD (Hard Disk Drive) and a CF (Compact Flash) having an area which is used to generate intermediate data and in which intermediate data is stored in addition to the RAM 120 having the common storage area 123 in the image forming apparatus, a preset capacity is added to the reference threshold value and the threshold value is changed.

When there is an external storing section which is used to generate intermediate data and in which the intermediate data is stored, a preset capacity which is added to the reference threshold value is previously set based on a capacity of an area which is used to generate intermediate data of current time and in which the intermediate data is stored in the common storage area 123, and a minimum capacity which is used to generate intermediate data and which is required to store the intermediate data, and is a value inherent in the image forming apparatus 1 determined by a capacity of the common storage area 123 and the structure of the image forming apparatus 1.

With respect to image forming apparatuses of recent years, when an error occurs during the image forming operation, it is necessary to again form an image of a page on which the error occurred. Therefore, a print is indemnified using at least one of a method in which generated intermediate data is stored until the image forming operation is completed and a method in which generated bitmap data is stored until the image forming operation is completed.

With respect to an image forming apparatus using the method in which bitmap data is stored until the image forming operation is completed, it is unnecessary to again carry out the rasterization processing, an area which is used to generate bitmap data and where the bitmap data is stored is not required. Therefore, the set threshold value can be changed to another threshold value after the rasterization processing is completed. However, in a case where an image forming apparatus employs the method in which intermediate data is stored until the image forming operation is completed, it is necessary to again carry out the rasterization processing to generate the bitmap data, and an area which is used to generate bitmap data and in which the bitmap data is stored is required and thus, a capacity of a set threshold value must be secured until the image forming operation in accordance with the bitmap data even after the rasterization processing is completed.

Hence, an image forming apparatus which indemnifies a printing by storing intermediate data until the image forming operation is completed is taken into consideration. In a case where a calculated threshold value is to be changed, when an image is not formed on a sheet by the print section 30 in accordance with bitmap data which is generated and stored based on electronic data of job data corresponding to a currently set threshold value, and there is electronic data of another job data, of which an image is formed on a sheet after the electronic data corresponding to the currently set threshold value, the CPU 100 of the present embodiment changes the threshold value in accordance with a comparison result between the currently set threshold value and a threshold value corresponding to the another job data, of which the image is formed after the electronic data corresponding to the currently set threshold value.

The ROM 110 stores various processing programs concerning image forming operation, data concerning the image forming operation, and data which is processed by various programs. The ROM 110 includes a data receiving section 111, an analyzing section 112, a bitmap data generating section 113, a print control section 114 and a threshold value managing section 115 as computer-readable recording media in which programs and data to realize the embodiment in cooperation with the CPU 100 and the RAM 120.

Stored in the data receiving section 111 are a program and data to realize functions to receive job data which is inputted from the external device 2 through the external IF 11 and to store the same in a spool area 122 in the RAM 120.

Stored in the analyzing section 112 are a program and data to realize functions to read out job data stored in the spool area 122 in the RAM 120, to generate intermediate data in an intermediate format between electronic data of the read out job data and bitmap data, and to store the same in the common storage area 123 in the RAM 120.

Stored in the bitmap data generating section 113 are a program and data to realize a function to execute the rasterization processing which generates and stores bitmap data in the common storage area 123 based on intermediate data which is generated by the analyzing section 112 and which is stored in the common storage area 123.

Stored in the print control section 114 are a program and data to realize functions to output bitmap data generated by the bitmap data generating section 113 to the print section 30 which forms an image in the recording medium, and to erase (releasing) the outputted bitmap data.

Stored in the threshold value managing section 115 is a program to realize a function to change a threshold value possessed by the common storage area 123 based on a description language format of electronic data. Further, a reference threshold value, various preset capacities which are added to the reference threshold value, and data are also stored in the threshold value managing section 115.

It is only necessary that the ROM 110 is a readable nonvolatile recording medium, and the ROM 110 may be a magnetic recording medium, an optical recording medium or a semiconductor memory. The ROM 110 may be fixed to a control substrate or detachably mounted thereon.

The RAM 120 includes a developing area 121, the spool area 122 and the common storage area 123. Data and the like concerning image forming operation, data processed by a program, and the like are temporarily stored in the RAM 120.

The developing area 121 is an area where various programs and data stored in the ROM 110 are developed, and where data is generated when programs or data is executed, e.g., a currently set threshold value in the common storage area 123, a calculated threshold value and the like are stored in the developing area 121.

The spool area 122 is an area where various pieces of data such as job data which is input from the external device 2 or the image reading section 20 are stored.

The common storage area 123 is an area where a plurality of areas coexist in accordance with a threshold value, and these areas are used to generate a plurality of pieces of data in different formats, i.e., intermediate data and bitmap data, and these pieces of intermediate data and bitmap data are stored in these areas. Areas (work areas, hereinafter) which are used to generate bitmap data and in which the bitmap data is stored are secured from a higher order address toward a lower order address in the common storage area 123, and areas (intermediate area, hereinafter) which is used to generate intermediate data and in which the intermediate data is stored are secured from a lower order address toward a higher order address in the common storage area 123.

In the common storage area 123, in a case where the intermediate areas and the work areas can be secured in the common storage area 123 without limitation, the printing operation can not be carried out and a dead lock state is generated when the work area can not be secured. To avoid such a dead lock state, work areas can be secured in the common storage area 123 without limitation, and a threshold value is provided for the intermediate area and intermediate areas that can be secured are limited.

That is, the threshold value means a capacity required to secure the work areas in the common storage area 123, and is a capacity that limits the intermediate area.

It is only necessary that the RAM 120 is a readable and writable recording medium, and the RAM 120 may be a HDD, a MRAM (Magnetic Random Access Memory) or a flash memory. The RAM 120 may be fixed to a control substrate or detachably mounted on the substrate.

The storing section 130 is a readable and writable recording medium and is a HDD, a CF or the like. The storing section 130 has a function as an external storing section including an intermediate area other than the RAM 120 having the common storage area 123. The storing section 130 may be fixed to a control substrate or detachably mounted on the substrate.

The external IF 11 is a communication interface such as a NIC (Network Interface Card) or a modem to be connected to a network N such as a LAN, and receives job data and the like from the external device 2. The received job data is outputted to the control section 10.

The operation display section 12 comprises an LCD (Liquid Crystal Display), a touch panel provided such as to cover the LCD, and a group of operation keys. Various setting screens required to input various setting conditions and various processing results are displayed on the operation display section 12 in accordance with a display signal which is input from the control section 10. The operation display section 12 outputs, to the control section 10, an operation signal which is input from the group of operation keys or the touch panel.

The image reading section 20 includes a document auto feeder and a reading section.

The document auto feeder is called an ADF (Auto Document Feeder), and sends documents placed on a document tray to a reading location of the reading section one sheet by one sheet.

The reading section includes a scanner provided with a light source, a lens, a contact glass and an image sensor. In the reading section, a document is irradiated with light, an image is formed using the reflected light, the image is converted photoelectrically, thereby reading the image of the document and outputting the same to the print section 30. Here, the term "image" is not limited to image data such as figure and photograph, and includes text data such as a character and a symbol.

The print section 30 includes an image forming section, a cleaning section, an intermediate transfer belt, a paper feeder, a transfer section, and a fixing device.

The image forming section includes an electrification device, an exposing apparatus, a developing device, a primary transfer roller, a cleaning device disposed around a photoconductive drum. According to the image forming section, the photoconductive drum electrically charged by the electrification device is irradiated with light corresponding to image data having a certain color (e.g., black (K)) from the exposing apparatus to form an electrostatic latent image, electrically charged black (K) toner is adhered to a surface of the photoconductive drum formed with the electrostatic latent image by the developing device, the electrostatic latent image is developed, the photoconductive drum to which the toner is adhered by the developing device is rotated at a constant speed to a transfer position where the transfer roller is disposed, and is transferred to a later-described intermediate transfer belt. After the toner is transferred to the intermediate transfer belt, remaining electric charge and remaining toner on the surface of the photoconductive drum are removed.

When the image forming apparatus 1 forms an image in accordance with image data of four colors, i.e., yellow (Y), magenta (M), cyan (C) and black (K), an image forming section is provided for each color.

The intermediate transfer belt is a semiconductive endless belt which is wound around a plurality of rollers and rotatably supported. The intermediate transfer belt is rotated by rotations of the rollers, the intermediate transfer belt is crimped against the photoconductive drum by the primary transfer roller, each toner developed on the surface of the photoconductive drum is transferred to the intermediate transfer belt at a transfer position by the primary transfer roller, and each color toner is successively transfer onto a recording medium at the transfer position by a secondary transfer roller.

A paper supply section includes a plurality of paper supply cassettes and a manual tray. Sheets of standardized size which are previously identified for each size and a paper kind are accommodated in each the paper supply cassette. The accommodated sheets are transferred to the transfer section from the uppermost portion one sheet by one sheet. Various sheets of nonstandard size can be set in the manual tray in accordance with a user's requirement. A sheet size and a paper passing width of the set sheets are detected, and the set sheets are transferred to the transfer section from the uppermost portion by the paper supply roller one sheet by one sheet.

The transfer section transfers sheets transferred from the paper tray and the manual tray through a plurality of intermediate rollers and resist rollers. Toner images transferred onto the intermediate transfer belt are collectively transferred onto the sheet by the secondary transfer roller.

A toner image transferred onto a sheet in the fixing device is thermally fixed on the sheet onto which the toner image is transferred. The fixed sheet is sandwiched by output rollers and output onto an output tray.

After the toner image is transferred onto the sheet by the secondary transfer roller, remaining toner is removed, by the cleaning section, from the intermediate transfer belt from which the sheet is separated electrostatically and in terms of curvature.

Next, the operation of the embodiment will be explained.

Figure 2:
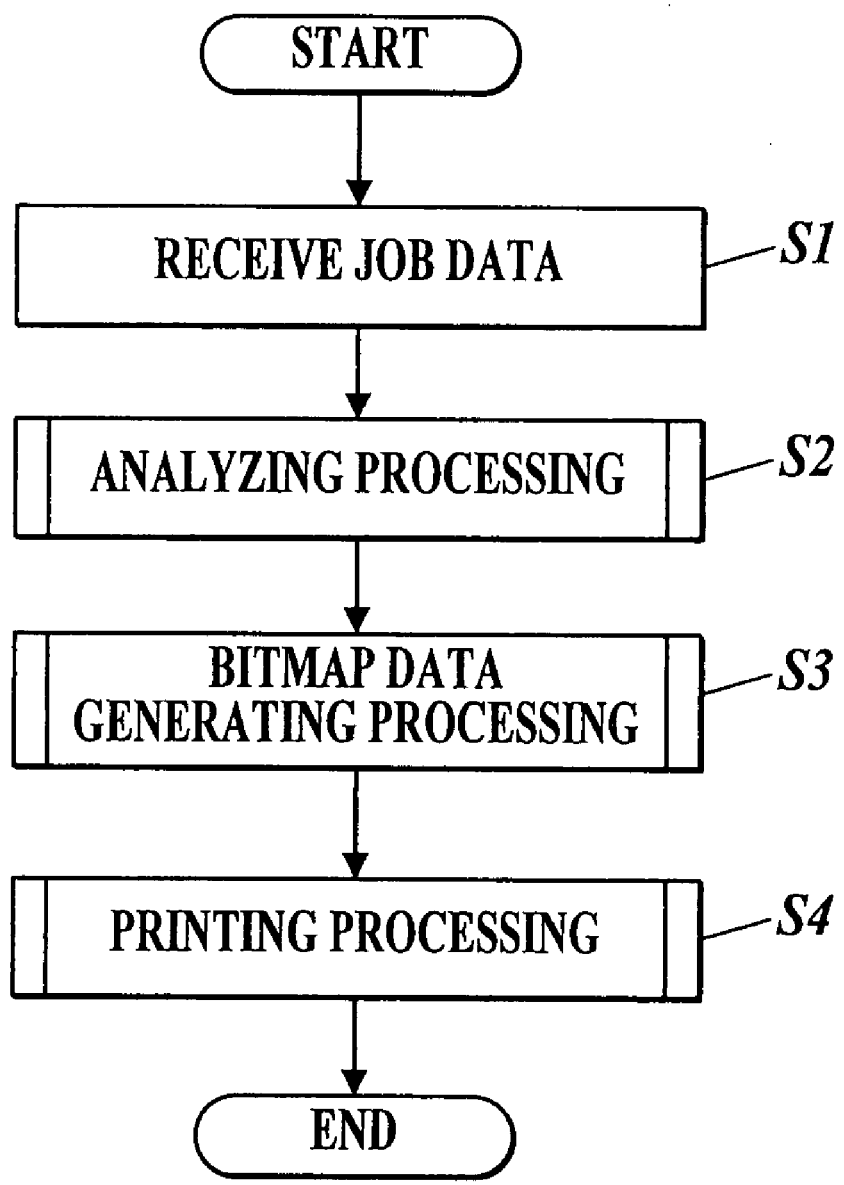
FIG. 2 is a diagram of processing which is carried out until an image is formed on a sheet based on job data and the sheet is ejected.

FIG. 2 is a diagram of processing which is carried out until an image is formed on a sheet based on the job data and the sheet is ejected. Each processing shown in FIG. 2 is carried out by the CPU 100. Processing modules carried out by the following steps S1 to S4 are operated in a multitasking manner, a plurality of pages can be processed in parallel, but these steps S1 to S4 are described in a time series.

By the data receiving section 111, the CPU 100 receives job data which is input through the external IF 11, and executes the data receiving processing to store it in the spool area 122 (step S1).

After the job data is stored in the spool area 122, the CPU 100 reads out job data stored in the spool area 122 by the analyzing section 112, and a threshold value corresponding to electronic data of this job data is calculated and set. After that, intermediate data is generated, and the analysis processing to store the data in the common storage area 123 is executed (step S2).

When the intermediate data for one page is stored in the common storage area 123, the CPU 100 executes rasterization processing to generate bitmap data in band unit by the bitmap data generating section 113, compresses the generated bitmap data in the band unit, stores the same in the common storage area 123, and generates bitmap data for one page (step S3).

When the bitmap data for one page is stored in the common storage area 123, the CPU 100 reads out the bitmap data for one page from the common storage area 123 by the print control section 114 and unarchives the same, and the unarchived bitmap data is output to the print section 30, an image of one page is formed on a sheet and output (step S4), and this processing is completed.

Figure 3:
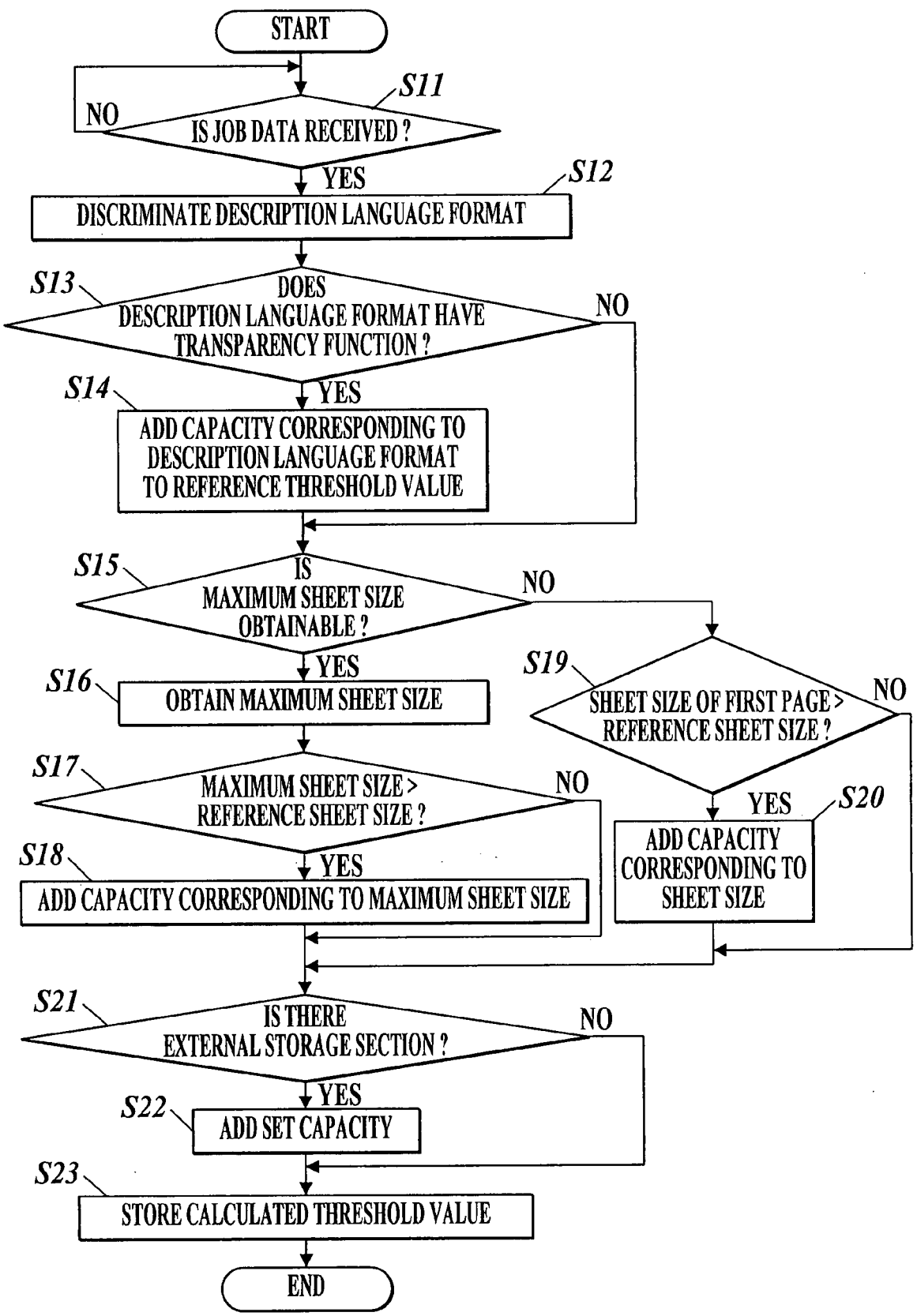
FIG. 3 is a flowchart of calculation of a threshold value executed in analysis processing in step S2.

FIG. 3 shows a calculation flowchart of the threshold value which is executed in the analysis processing of step S2. The operation shown in FIG. 3 is executed in the CPU 100 by the threshold value managing section 115.

The CPU 100 determines whether job data is received and it is stored in the spool area 122 (step S11), and when it is determined that the job data is not received (step S11; No), the CPU 100 waits until job data is received.

When it is determined that the job data is received and it is stored in the spool area 122 (step S11; Yes), the CPU 100 reads out the job data stored in the spool area 122, and discriminates a description language format of electronic data of the read out job data (step S12).

The CPU 100 determines whether the discriminated description language format has a transparency function (step S13), and in a case where it is determined that the description language format has no transparency function (step S13; No), the procedure is advanced to step S15.

When it is determined that the description language format discriminated in step S12 has a transparency function (step S13; Yes), the CPU 100 adds a capacity corresponding to a kind of the description language format to a reference threshold value and calculates a threshold value (step S14).

After step S13; No or after step S14, the CPU 100 determines whether the description language format discriminated in step S12 includes information indicative of sheet size of each page, whether the sheet size of each page is obtained from electronic data in the description language format, and whether the description language format can obtain the maximum sheet size among the obtained sheet sizes (step S15).

In a case where it is determined that the description language format discriminated in step S12 can obtain the maximum sheet size (e.g., PDL or XPS) (step S15; Yes), the CPU 100 obtains a sheet size of each page from the electronic data, obtains the maximum sheet size among the obtained sheet sizes (step S16), and determines whether the maximum sheet size is greater than a predetermined sheet size (reference sheet size, hereinafter) (step S17).

When the CPU 100 determines that the obtained maximum sheet size is equal to or smaller than the reference sheet size (step S17; No), the procedure is advanced to step S21.

When the CPU 100 determines that the obtained maximum size is greater than the reference sheet size (step S17; Yes), the CPU 100 adds a capacity corresponding to the maximum sheet size to a threshold value calculated in step S14 when the description language format has the transparency function, and to a reference threshold value when the description language format has no transparency function (step S18).

When the CPU 100 determines that the obtained description language format can not obtain the maximum sheet size (step S15; No), the CPU 100 obtains a sheet size of a page (first page) which is first generated by intermediate data from electronic data, and the CPU 100 determines whether the sheet size of the obtained first page is greater than the reference sheet size (step S19).

When the CPU 100 determines that the sheet size of the obtained first page is equal to or smaller than the reference sheet size (step S19; No), the procedure is advanced to step S21.

When the CPU 100 determines that the sheet size of the obtained first page is greater than the reference sheet size (step S19; Yes), the CPU 100 adds a capacity corresponding to the sheet size of the first page to the threshold value calculated in step S14 when the description language format has the transparency function, and to a reference threshold value when the description language format has no transparency function (step S20).

After step S17; No, or after step S18, or after step S19; No, or after step S20, CPU 100 determines whether there exists an external storing section having an intermediate area (step S21), and in a case where it is determined that such an external storing section does not exist (step S21; No), the procedure is advanced to step S23.

When the CPU 100 determines that the external storing section having the intermediate area exists (i.e., there exists the storing section 130 in this embodiment) (step S20; Yes), a preset capacity is added to the threshold value calculated in step S18 or 20 (step S22).

After step S21; No or after step S22, the CPU 100 stores the calculated threshold value in association with the job data (step S23), and this processing is completed.

When the discriminated description language format has no transparency function and the maximum sheet size or a sheet size of the first page is equal to or smaller than the reference sheet size and there exists No external storing section, the reference threshold value is stored in association with the threshold value of the job data, and this processing is completed.

FIG. 4 is a flowchart of operation to change and set the threshold value calculated in step S23.

The operations shown in FIG. 4 are executed by the threshold value managing section 115 in the CPU 100.

The CPU 100 determines whether rasterization processing of the electronic data of the job data with respect to the currently set threshold value is completed (step S31), and when the rasterization processing is not yet completed (step S31; No), the CPU 100 waits.

When it is determined that the electronic data of the job data with respect to the currently set threshold value is completed (step S31; Yes), the CPU 100 determines whether the printing processing is executed based on the job data with respect to the currently set threshold value, and output to a sheet on which an image is formed by the job data is completed (step S32).

When the CPU 100 determines that output to the sheet on which the image is formed by the job data with respect to the currently set threshold value is not completed (step S32; No), the CPU 100 determines whether there exists job data which is to be outputted next (step S33).

When the CPU 100 determines that there exists no job data which is to be outputted next (step S33; No), the procedure is advanced to step S36.

When the CPU 100 determines that there exists job data to be output next (step S33; Yes), it is determined whether the currently set threshold value is smaller than a threshold value which is calculated with respect to the job data which is to be outputted next (step S34).

When the CPU 100 determines that the currently set threshold value is smaller than the threshold value (step S34; Yes), the CPU 100 changes the currently set threshold value to the threshold value with respect to the job data which is to be outputted next (step S35), and the procedure is returned to step S32.

When the CPU 100 determines that the currently set threshold value is equal to or greater than the threshold value (step S34; No), the CPU 100 does not change the currently set threshold value and maintains this value (step S36), and the procedure is returned to step S32.

When the CPU 100 determines that a sheet on which an image is formed by the job data with respect to the currently set threshold value is outputted (step S32; Yes), it is determined whether there exists job data which is to be outputted next (step S37).

When the CPU 100 determines that there is job data which is to be outputted after the job data with respect to the currently set threshold value (step S37; Yes), the CPU 100 changes the currently set threshold value to the threshold value of the job data which is to be outputted next (step S38), and this processing is completed.

When the CPU 100 determines that there is no job data which is to be outputted after the job data with respect to the currently set threshold value (step S37; No), the CPU 100 changes the currently set threshold value to the reference threshold value (step S39), and this processing is completed.

According to this embodiment, as described above, in the case where electronic data in a description language format has a transparency function which requires much more work areas than electronic data in a description language format having no transparency function, since a capacity of a threshold value can be increased and changed, the problem that the processing is stopped until a work area can be secured can be reduced, reduction of throughput can be suppressed, and in the case where electronic data in a description language format is capable of obtaining the maximum sheet size, a capacity of a threshold value can be increased and changed based on the maximum sheet size among the sheet sizes of pages of the electronic data that most requires work areas and thus, the problem that the processing is stopped until a work area can be secured can be reduced, and the reduction of throughput can be suppressed.

That is, since the threshold value of the common storage area 123 can be changed based on the description language format of the electronic data, it is possible to secure a work area required in accordance with a description language format, and the reduction of throughput can be suppressed.

Further, when there exists an external storing section having an intermediate area in the image forming apparatus 1, since the threshold value can be changed, more work areas can be secured as compared with a case in which there exists an external storing section having no intermediate area.

When an image is not formed on a sheet by the print section 30 in accordance with bitmap data of electronic data corresponding to a currently set threshold value, and when there is electronic data whose image is formed after the electronic data corresponding to the currently set threshold value, the threshold value can be changed in accordance with a comparison result between the currently set threshold value and a threshold value corresponding to the electronic data whose image is formed on a sheet size after the electronic data corresponding to the currently set threshold value, and even when an image forming apparatus uses a method for storing intermediate data until the image forming operation is completed, the printing operation can be indemnified.

The present invention is not limited to the contents of the embodiment, and the invention can appropriately be modified within a range not departing from a subject matter of the invention.

The present U.S. patent application claims a priority under the Paris Convention of Japanese patent application No. 2006-198234 filed on Jul. 20, 2006, and shall be a basis of correction of an incorrect translation.

What is claimed is:
1. An image forming apparatus comprising:
a storing section that has a common storage area, the common storage area having a plurality of areas that are coexisting in the common storage area in accordance with a threshold value and are used to generate and store a plurality of pieces of data that have different formats based on electronic data;
a language format discriminating section to discriminate a description language format of the electronic data; and
a control section to change the threshold value based on the description language format discriminated by the language format discriminating section.
2. The image forming apparatus of claim 1, wherein the control section changes the threshold value in a case where it is determined that the description language format has a transparency function, based on the description language format discriminated by the language format discriminating section.

3. The image forming apparatus of claim 1, wherein the control section obtains a sheet size of each page from the electronic data in the description language format and changes the threshold value in accordance with the maximum sheet size of the obtained sheet sizes in a case where it is determined that the description language format includes information that indicate sheet size of each page, based on the description language format discriminated by the language format discriminating section.

4. The image forming apparatus of claim 1, wherein the control section changes the threshold value in a case where there is an external storing section which is used to generate data other than data that makes an image be formed on a recording medium among the plurality of pieces of data in different formats, the external storage area having an area to store the generated data.

5. The image forming apparatus of claim 1, further comprising:
an image forming section which forms an image on a recording medium based on data, that makes the image be formed on the recording medium, among the plurality of pieces of data in different formats, wherein
the control section changes the threshold value in accordance with a comparison result between a currently set threshold value and a threshold value corresponding to another piece of electronic data that makes another image be formed on the recording medium after the electronic data corresponding to the currently set threshold value, in a case where the image is not formed on the recording medium by the image forming section in accordance with the data that makes the image be formed on the recording medium, among the plurality of pieces of data in different formats which are generated and stored based on the electronic data corresponding to the currently set threshold value, the case where the another piece of electronic data that makes the another image be formed on the recording medium existing after the electronic data corresponding to the currently set threshold value.

6. The image forming apparatus of claim 1, wherein
the plurality of pieces of data in different formats are data in bitmap format and data in intermediate format, the intermediate format having a format between the electronic data and the data in the bitmap format obtained by interpreting the electronic data, and
the threshold value is a value which is used to generate the data in the intermediate format and limits an area in the common storage area where the data in the intermediate format is stored.

7. An image forming method using an image forming apparatus, the method comprising the steps of:
discriminating, by the language format discriminating section, a description language format of electronic data; and
changing, by the image forming apparatus, a threshold value based on the discriminated description language format, there being a common storage area wherein a plurality of areas coexist in accordance with the threshold value, the plurality of areas being used to generate and store a plurality of pieces of data that have different formats based on the electronic data.

8. The image forming method of claim 7, wherein in the changing step, the threshold value is changed in a case where it is determined that the description language format has a transparency function, based on the discriminated description language format.

9. The image forming method of claim 7, wherein in the changing step, a sheet size of each page is obtained from the electronic data in the description language format and the threshold value is changed in accordance with the maximum sheet size of the obtained sheet sizes in a case where it is determined that the description language format includes information that indicate sheet size of each page, based on the discriminated description language format.

10. The image forming method of claim 7, wherein in the changing step, the threshold value is changed in a case where there is an external storing section which is used to generate data other than data that makes an image be formed on a recording medium among the plurality of pieces of data in different formats, the external storage area having an area to store the generated data.

11. The image forming method of claim 7, further comprising:
an image forming step to form, in the image forming apparatus, an image on a recording medium based on data, that makes the image be formed on the recording medium, among the plurality of pieces of data in different formats, wherein
in the changing step, the threshold value is changed in accordance with a comparison result between a currently set threshold value and a threshold value corresponding to another piece of electronic data that makes another image be formed on the recording medium after the electronic data corresponding to the currently set threshold value, in a case where the image is not formed on the recording medium in the image forming step in accordance with the data that makes the image be formed on the recording medium, among the plurality of pieces of data in different formats which are generated and stored based on the electronic data corresponding to the currently set threshold value, the case where the another piece of electronic data that makes the another image be formed on the recording medium existing after the electronic data corresponding to the currently set threshold value.

12. The image forming method of claim 7, wherein
the plurality of pieces of data in different formats are data in bitmap format and data in intermediate format, the intermediate format having a format between the electronic data and the data in the bitmap format obtained by interpreting the electronic data, and
the threshold value is a value which is used to generate the data in the intermediate format and limits an area in the common storage area where the data in the intermediate format is stored.

13. A computer-readable recording medium which stores a program, the program causing a computer to serve as:
a language format discriminating section to discriminate a description language format of electronic data; and
a control section to change a threshold value based on the description language format discriminated by the language format discriminating section, there being a common storage area wherein a plurality of areas coexist in accordance with the threshold value, the plurality of areas being used to generate and store a plurality of pieces of data that have different formats based on the electronic data.

14. The computer-readable recording medium which stores the program of claim 13, wherein the control section changes the threshold value in a case where it is determined that the description language format has a transparency function, based on the description language format discriminated by the language format discriminating section.

15. The computer-readable recording medium which stores the program of claim 13, wherein the control section obtains a sheet size of each page from the electronic data in the description language format and changes the threshold value in accordance with the maximum sheet size of the obtained sheet sizes in a case where it is determined that the description language format includes information that indicate sheet size of each page, based on the description language format discriminated by the language format discriminating section.

16. The computer-readable recording medium which stores the program of claim 13, wherein the control section changes the threshold value in a case where there is an external storing section which is used to generate data other than data that makes an image be formed on a recording medium among the plurality of pieces of data in different formats, the external storage area having an area to store the generated data.

17. The computer-readable recording medium which stores the program of claim 13, further comprising:
an image forming section which forms an image on a recording medium based on data, that makes the image be formed on the recording medium, among the plurality of pieces of data in different formats, wherein
the control section changes the threshold value in accordance with a comparison result between a currently set threshold value and a threshold value corresponding to another piece of electronic data that makes another image be formed on the recording medium after the electronic data corresponding to the currently set threshold value, in a case where the image is not formed on the recording medium by the image forming section in accordance with the data that makes the image be formed on the recording medium, among the plurality of pieces of data in different formats which are generated and stored based on the electronic data corresponding to the currently set threshold value, the case where the another piece of electronic data that makes the another image be formed on the recording medium existing after the electronic data corresponding to the currently set threshold value.

18. The computer-readable recording medium which stores the program of claim 13, wherein
the plurality of pieces of data in different formats are data in bitmap format and data in intermediate format, the intermediate format having a format between the electronic data and the data in the bitmap format obtained by interpreting the electronic data, and
the threshold value is a value which is used to generate the data in the intermediate format and limits an area in the common storage area where the data in the intermediate format is stored.

\* \* \* \* \*